Dec. 21, 1943.  M. O. SEM ET AL  2,337,279
ARRANGEMENT IN SELF BAKING ELECTRODES
Filed Sept. 5, 1941  2 Sheets-Sheet 2
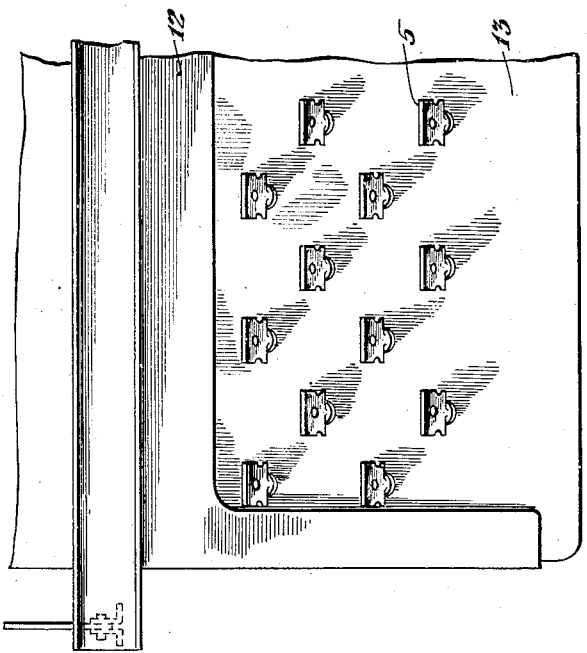
Fig. VI
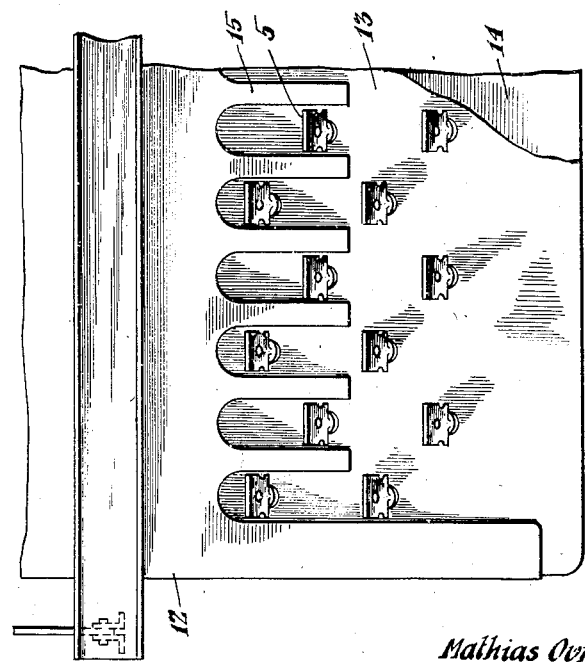
Fig. V
INVENTORS
Mathias Ovrom Sem
Johannes Sejersted
BY
ATTORNEY Patented Dec. 21, 1943

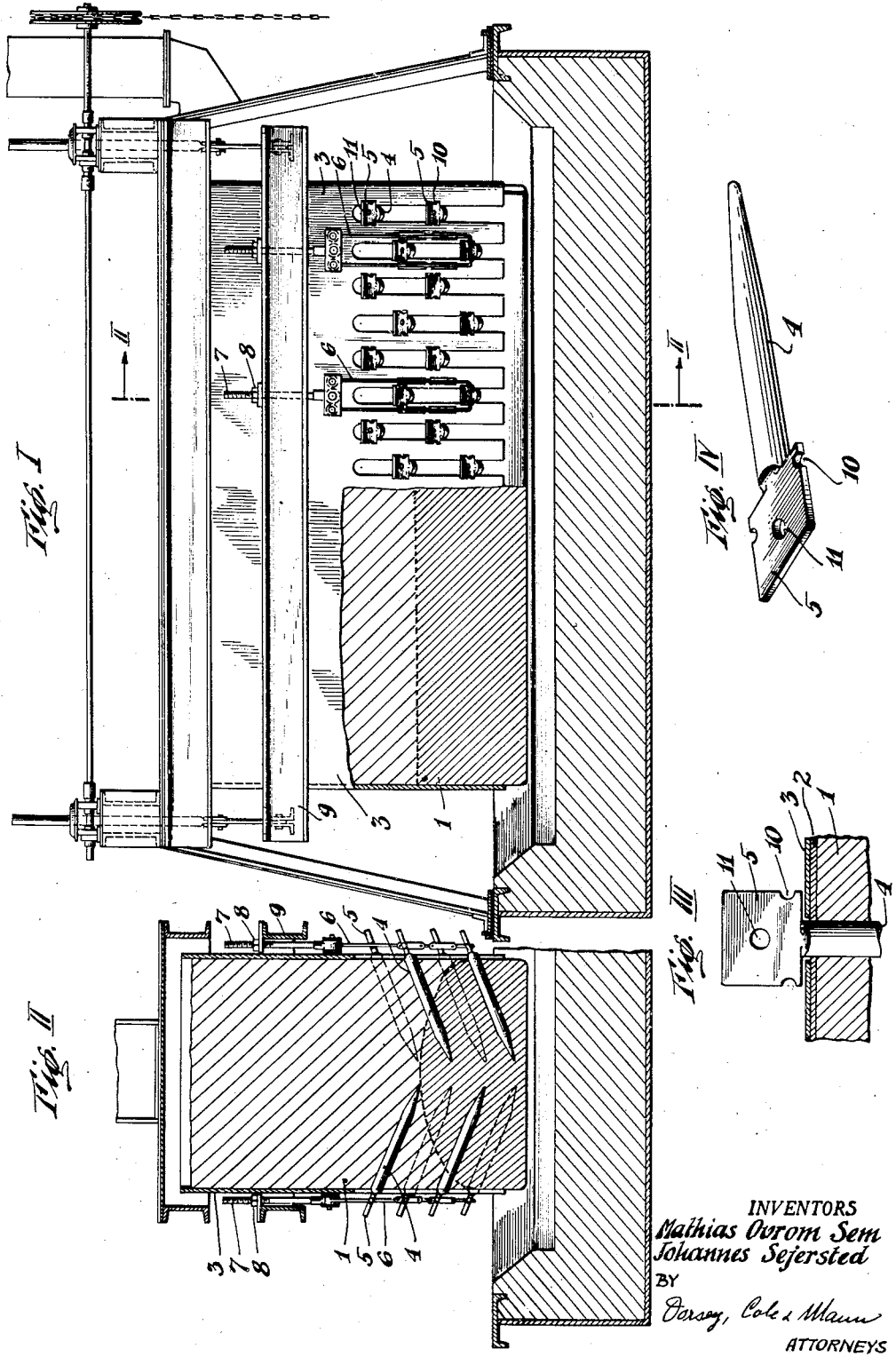

2,337,279

UNITED STATES PATENT OFFICE 2,337,279

ARRANGEMENT IN SELF-BAKING ELECTRODES

Mathias Ovrom Sem, Smestad, and Johannes Sejersted, Roa, Norway; vested in the Alien Property Custodian Application September 5, 1941, Serial No. 409,742 In Norway July 2, 1940

3 Claims. (Cl. 13—14)

This invention relates to an improvement in the production of oblong Soederberg electrodes.

It has previously been pointed out that the upper part of the Soederberg electrodes consists of paste which is sufficiently soft so that it will flow and develop hydrostatic pressure tending to deform the electrode and tending to cause the casing for the electrode to assume a cylindrical shape. For this reason, it has previously been suggested that the electrode be held in place by metal bars or frames as shown, for example, in Legeron Patent No. 2,169,563, or Torchet Patent No. 2,073,356.

In the present invention, we utilize a permanent casing for the electrode such as is shown in Sem Patent No. 2,159,183. If such a casing is made of sheet metal or thin plates, it will serve to guide the electrode but does not have sufficient rigidity to maintain the electrode in the desired rectangular shape.

It has also been suggested in the patents referred to, to employ metal studs which are driven into the electrode primarily for the purpose of transmitting the electric current into the electrode mass. These contact studs ordinarily are driven in at an angle relative to the horizontal so that the inner end is the lower end. These studs have previously also been used as a means for supporting the electrode mass.

It is to be noted that in these previous uses of the contact studs they served no function until they had been firmly baked into the electrode. In previous experience where outside reinforcement bars or frames were used, the contact studs were inserted into the soft paste. Then for several weeks they did nothing until they had moved down to become the next to the bottom row. Then, a short time before the bottom row of studs was to be pulled out, it has been customary for some of the current to be passed through the next to the bottom row of studs. Finally after the surrounding mass was fully hardened, these studs were used to carry the weight of the electrode and the row below was removed.

In the present case these studs are given a new function. As before, they are inserted into the soft paste, with the inner ends below the outer ends, and the fixed casing in which the mass is assembled is cut away (at least in part) so that the studs can be driven in at a zone where the mass is still fluid.

Ordinarily the electrode will be provided with the usual movable casing or sheath and as the studs are driven into the soft electrode mass quite close to lower edge portions of the fixed casing, this inner casing or sheath will be stiffened sufficiently by the adjacent fixed casing so that in this zone there is but little danger of deformation. As the electrode moves downwardly, the effect of this stiffening from the fixed casing is reduced and there is a zone ordinarily from 20 cm. to 40 cm. wide within which the bracing for the fixed casing is no longer sufficient to support the movable casing and the hydrostatic head of the electrode mass will cause deformation to take place unless some means is employed to prevent it. The central or inner part of the electrode mass starts to harden even while the outer part is sufficiently fluid to exert pressure tending to cause distortion, and we have discovered that if the zone into which the studs are driven is quite close to the zone in which the central part of the mass has begun to harden, then within the danger zone just referred to, the inner and lower ends of the studs will be anchored sufficiently firmly in the harder and partly baked central portions of the electrode mass so that they can be employed to overcome the pressure of the softer portion of the mass which is still fluid. This result is accomplished by employing heads or projections on the studs which, either directly, or indirectly through extensions of the fixed casing, cooperate with the movable casing to hold the electrode mass in desired shape.

As stated the electrode should be provided with a sheath or movable casing which ordinarily will be made of the same metal as is to be treated. Since this type of electrode is ordinarily used in the manufacture of aluminum, this means that the movable casing or sheath should be made of aluminum. As has previously been suggested, instead of making the sheath of aluminum, thin iron sheets may be used which are torn off or unrolled, or iron plates may be employed which are removed at the same time that the contact studs are removed. It is to be understood that where the shoulders of the contact studs bear directly against the movable casing, the fixed casing does not need to extend down far enough to have slots formed in it, though obviously even in this case projections forming such slots may be employed.

While the method of this application may be employed as the sole method of holding the electrode against distortion, it is preferable to have further reinforcement of the upper part of the electrode. Such reinforcement may be in the form of steel bars as has previously been suggested.

Our invention may readily be understood from the illustrative example shown in the accompanying drawings, in which Fig. I is a side view of a furnace pot and electrode involving our invention, with the furnace pot and part of the electrode shown in section; Fig. II is a sectional view on line II—II of Fig. I. Fig. III is a sectional plan view showing the upper end of one of the contact studs in place in an electrode provided with a movable casing. Fig. IV is a perspective view of the outer portion of such a contact stud. Fig. V is a side view of a portion of an electrode in which the contact studs bear directly against the inner casing and the permanent casing is still provided with slots. Fig. VI is a construction similar to Fig. V where the fixed casing is entirely cut away to permit the insertion of the contact studs.

In these drawings, the electrode 1 may preferably be surrounded by a movable aluminum casing 2 attached to and forming part of the electrode. The electrode as shown in Fig. III is enveloped at its upper end by a permanent casing 3 which runs down close to the bath surface and is slotted to provide a place for the contact studs 4 which are inserted into the electrode as has been described in earlier patents. The upper ends of the bolts 4 are broadened out as shown at 5 to form projections or shoulders which bear against the casing 3. The suspension of the electrode is effected by means of the contact studs 4 which are connected with the tie-rod 7 by means of a chain 6 which engages notches 10 in the heads of the contact studs. The rods 7 are adjustably mounted in the suspension bar 9 which is vertically movable by mechanism described in previous patents. For the purpose of simplicity, the electrical connections are not shown in these drawings, but are intended to be made by the use of the holes 11 formed in the heads of the contact studs. In the same way, the suspension of the electrode is only illustrated by two sets of chains 6 which are shown in Fig. I and in Fig. II. Ordinarily the suspension will be supplied through a large number of such chain sets.

With an electrode of this type hardening takes place more rapidly toward the center of the electrode than toward the outside. Thus in Fig. II we indicate the approximate zone of hardening. It is of course understood that this will not actually be a sharp line of differentiation but will be progressive.

When the contact studs are first inserted in the paste it is very soft but as the electrode moves downwardly it tends to harden so that the inner or lower ends of the contact studs gradually become engaged and locked in place by the hardening electrode so that even though the paste is fluid adjacent the heads of these contact studs, still the contact studs serve to preserve the casing in desired shape against the hydrostatic pressure.

If desired, the bearing faces of the projections or shoulders on the contact studs may be so shaped that when the contact studs are driven home in the soft electrode paste and these bearing surfaces are forced against the casing, the contact studs will assume the correct angle in the electrode.

Fig. V shows a portion of the fixed casing and of an electrode having a movable casing with the studs driven in so that they bear directly against the movable casing. In this figure the fixed casing is designated by the numeral 12, the movable casing by the numeral 13 and the electrode mass by the numeral 14. As before, the studs are designated by the numeral 5. In this example the casing 12 has projections 15 spaced far enough apart so that the shoulders on the studs 5 bear directly against the casing 13.

In the example shown in Fig. VI the structure is exactly the same as that shown in Fig. V except in this case the casing 12 is not supplied with the projections such as are designated 15 in Fig. V.

It is understood that the drawings are intended only to illustrate this particular invention and that many modifications and variations, many of which have been shown in previous patents relating to the Soederberg electrode system, may be employed in conjunction with the present invention.

What we claim is:

1. In a selfbaking electrode construction, an electrode mass having a casing which moves with it, a fixed casing within which the electrode mass can be collected having portions of its bottom edge sufficiently high so that contact studs can be driven into the electrode mass below such edge portions to enter a zone where the mass is still fluid but closely adjacent to a zone where interior portions of the mass have begun to harden, contact studs in approximately horizontal rows extending into the mass with their inner ends below their outer ends, and bearing surfaces near the outer ends of such studs cooperating with the movable casing so that as a row of studs moves downwardly and away from said edge portions of the fixed casing, the lower ends of such studs become anchored in the hardened interior portions of the electrode mass and said bearing surfaces serve to hold the movable casing in fixed position relative to such interior portion and thereby prevent the exterior portion of the electrode from becoming distorted by the hydrostatic pressure of the fluid mass.

2. A structure as specified in claim 1 in which the fixed casing has projections extending down between rows of contact studs and the bearing surfaces of the contact studs are shoulders which bear against these projections and act through these projections to cooperate with the movable casing to prevent the electrode from becoming distorted.

3. A structure as specified in claim 1 in which the bearing surface bears directly against the movable casing.

MATHIAS OVROM SEM.
JOHANNES SEJERSTED.